United States Patent
Satokawa et al.

(10) Patent No.: US 6,875,410 B2
(45) Date of Patent: Apr. 5, 2005

(54) ADSORBENT FOR REMOVING SULFUR COMPOUNDS FROM FUEL GASES AND REMOVAL METHOD

(75) Inventors: Shigeo Satokawa, Tokyo (JP); Yuji Kobayashi, Tokyo (JP)

(73) Assignee: Tokyo Gas Co., Ltd., Tokyo (JP)

( * ) Notice: Subject to any disclaimer, the term of this patent is extended or adjusted under 35 U.S.C. 154(b) by 0 days.

(21) Appl. No.: 10/429,913

(22) Filed: May 5, 2003

(65) Prior Publication Data

US 2004/0057890 A1 Mar. 25, 2004

Related U.S. Application Data

(63) Continuation-in-part of application No. 09/774,966, filed on Jan. 31, 2001, now abandoned.

(30) Foreign Application Priority Data

| Feb. 1, 2000 | (JP) | 2000-23955 |
| Apr. 25, 2000 | (JP) | 2000-123527 |
| Aug. 1, 2000 | (JP) | 2000-232780 |
| Aug. 25, 2000 | (JP) | 2000-256493 |

(51) Int. Cl.$^7$ ............... B01J 29/10; C07C 7/12; C10G 25/05
(52) U.S. Cl. ............... 423/244.1; 208/247; 423/230; 423/244.04; 423/244.11; 585/820
(58) Field of Search .............. 423/230, 244.11, 423/244.1, 244.04, 244.05, 244.06; 48/127.3, 197 FM, 198.3; 208/247; 585/820

(56) References Cited

U.S. PATENT DOCUMENTS

| 2,442,982 A | * | 6/1948 | Nachod | 208/245 |
| 3,078,640 A | * | 2/1963 | Milton | 95/136 |
| 3,971,712 A | * | 7/1976 | Miller | 208/208 R |
| 4,188,285 A | * | 2/1980 | Michlmayr | 208/246 |
| 4,358,297 A | * | 11/1982 | Eberly, Jr. | 95/136 |
| 5,146,039 A | * | 9/1992 | Wildt et al. | 585/820 |
| 5,164,076 A | * | 11/1992 | Zarchy et al. | 208/245 |
| 5,807,475 A | * | 9/1998 | Kulprathipanja et al. | 208/208 R |
| 5,919,354 A | * | 7/1999 | Bartek | 208/299 |
| 5,935,422 A | * | 8/1999 | Zinnen | 208/310 Z |
| 2002/0009404 A1 | * | 1/2002 | Tsybulevskiy et al. | 423/244.04 |
| 2003/0163013 A1 | * | 8/2003 | Yang et al. | 585/823 |
| 2004/0040891 A1 | * | 3/2004 | Yang et al. | 208/299 |

FOREIGN PATENT DOCUMENTS

| CN | 1227255 A | * | 9/1999 |
| CN | 1242261 A | * | 1/2000 |
| EP | 0 056 197 A1 | * | 7/1982 |
| JP | 06256779 A | * | 9/1994 |
| JP | 06306377 A | * | 11/1994 |
| JP | 10237473 A | * | 9/1998 |
| JP | 296934 B2 | * | 11/1999 |
| WO | WO 00/71249 A1 | * | 11/2003 |

OTHER PUBLICATIONS

English translation of: "Adsorptions of Dimethyl Sulfide On Metal Ion–Exchanged Y–Type Zeolites", Kasaoka et al., in "The Chemical Society of Japan", 1981, No. 12, pp. 1945–1950.*

DERWENT Abstract accession No. 1989–019397, for JP63294943 A, published Dec. 1988.*

* cited by examiner

*Primary Examiner*—Stanley S. Silverman
*Assistant Examiner*—Ardith E Hertzog
(74) *Attorney, Agent, or Firm*—Flynn, Thiel, Boutell & Tanis, P.C.

(57) ABSTRACT

An adsorbent for removing sulfur compounds from sulfur compounds-containing fuel gas contains a zeolite ion-exchanged with Ag and has an excellent performance when used to remove sulfur compounds from the fuel gas, irrespective of the moisture concentration in the fuel gas, and a method for removing sulfur compounds from sulfur compounds-containing fuel gas by use of an adsorbent of the above-mentioned type. The zeolite is a Na—+Y type zeolite.

6 Claims, 5 Drawing Sheets

Relation between silver content and adsorption of sulfur under condition at different dew points FIG. 6C — Dew point of −20°C FIG. 6B — Dew point of −40°C FIG. 6A — Dew point of −60°C

ADSORBENT FOR REMOVING SULFUR COMPOUNDS FROM FUEL GASES AND REMOVAL METHOD

This is a continuation-in-part of Ser. No. 09/774,966, filed Jan. 31, 2001, now abandoned.

BACKGROUND OF THE INVENTION

1. Field of the Invention

This invention relates to an adsorbent for removing sulfur compounds, which is used to remove sulfur compounds by adsorption from a fuel gas such as a city gas, liquefied petroleum gas or a natural gas. The invention also relates to a method for removing sulfur compounds from a sulfur compound-containing fuel gas by use of an adsorbent for removal of such sulfur compounds.

2. Prior Art

Lower hydrocarbon gases such as methane, ethane, propane, butane and the like, or gases such as a natural gas, a city gas, an LP gas or the like gas containing these hydrocarbon gases, are used not only as an industrial or domestic fuel, but also as a starting material for preparing hydrogen that is utilized as a fuel for fuel cells or an atmospheric gas. In a steam reforming process, which is an industrial preparation process of hydrogen, these lower hydrocarbon gases are reformed by the addition of steam in the presence of a catalyst, such as a Ni-based catalyst, a Ru-based catalyst or the like, thereby forming a reformed gas mainly composed of hydrogen.

A fuel gas such as a city gas, an LP gas or the like is usually incorporated with a sulfur compound, such as a sulfide, a thiophene or a mercaptan, for use as an odorant for the purpose of security against the leakage thereof. More particularly, sulfides include dimethyl sulfide (hereinafter referred to simply as DMS), ethylmethyl sulfide, diethyl sulfide and the like, thiophenes include tetrahydrothiophene (hereinafter referred to simply as THT), and mercaptans include t-butyl mercaptan (hereinafter referred to simply as TBM), isopropyl mercaptan, n-propyl mercaptan, t-amyl mercaptan, t-heptyl mercaptan, methyl mercaptan, ethyl mercaptan and the like.

DMS, THT and TBM are, in most cases, used as an ordinarily added odorant, and are usually added not only singly, but also in admixtures of two or more (e.g. both DMS and TBM have been added to almost all city gases in the Metropolitan area of Japan at present). The concentration of the odorant is at a level of several ppm without exception. The catalyst used for such a steam reforming process as set out above is poisoned with these sulfur compounds, thus leading to the degradation of its performance. Accordingly, these sulfur compounds in a fuel gas should be preliminarily removed from a fuel gas. Even if it is inevitable that a residual sulfur compound be contained in small amounts in the fuel gas from which the sulfur compounds have been removed, the amount of the residual sulfur compound should preferably be as small in concentration as possible.

For the removal of a sulfur compound from a fuel gas, it is usual to use a hydrodesulfurization process or a process using an adsorbent. The hydrodesulfurization process comprises adding hydrogen to a fuel gas, decomposing and converting a sulfur compound into hydrogen sulfide in the presence of a catalyst such as a Co—Mo catalyst, and desulfurizing by adsorption of hydrogen sulfide, which is a decomposition product, by means of a desulfurizing agent such as zinc oxide, iron oxide or the like. Although the hydrodesulfurization process is a reliable process, it is necessary to convert all sulfur compounds into hydrogen sulfide by hydrogenation and heating to about 300 to 400° C. In addition, since zinc oxide or iron oxide is used for adsorption and removal, operations become complicated. Accordingly, this process has been employed in a large-scale plant, but is difficult to apply to a small-sized apparatus.

On the other hand, the process using an adsorbent is one wherein a fuel gas is passed through an adsorbent mainly composed of activated carbon, a metal oxide, zeolite or the like to remove a sulfur compound by adsorption. Although the process using an adsorbent includes a process wherein adsorptivity is increased by application of heat, adsorption at normal temperatures is preferred because a simpler system is realized. A process of removing a sulfur compound at normal temperatures by use of an adsorbent needs neither heat or hydrogen as in a hydrodesulfurization process or a thermal adsorption process, and thus, is a simple desulfurization process.

As a matter of course, however, the process of removing a sulfur compound by use of an adsorbent is unable to remove the sulfur compound from a gas if the adsorbent is saturated with once-adsorbed sulfur compounds. Thus, an exchange or regeneration of an adsorbent is necessary. Because the required amount of an adsorbent and frequency of exchange are greatly influenced depending on the adsorptivity of an adsorbent, there is a demand for an adsorbent having a higher adsorptivity. The performance of an adsorbent is influenced, especially, by the properties of a sulfur compound. Hence, with a gas containing a plurality of sulfur compounds such as a city gas, for example, a single adsorbent should have a high adsorptivity for plural sulfur compounds. Otherwise, a very burdensome problem will arise, e.g. a plurality of adsorbents corresponding to individual sulfur compounds are undesirably required.

Up to now, various types of adsorbents for sulfur compounds in a gas have been proposed. For instance, in Japanese Laid-open Patent Application No. Hei 6-306377, mercaptans that are used as an odorant for fuel gases such as a city gas, an LP gas and the like are selectively removed in an oxygen-free atmosphere by means of a zeolite exchanged with a polyvalent metal other than hydrogen and/or an alkaline earth metal. It is stated that as the polyvalent metal ions, there are preferably used those ions of Mn, Fe, Co, Ni, Cu, Sn and Zn. The sulfur compounds, which are to be adsorbed according to this technique, are directed only to mercaptans that are easily adsorbed.

We conducted experiments using a number of commercially available adsorbents including various types of porous materials such as zeolites, activated carbon, metal compounds, activated alumina, silica gels, activated clays, clay minerals and the like. Part of the results is shown in Table 2 appearing hereinafter. As a result, it was found that a specific type of activated carbon and a specific type of zeolite (Japan Laid-open Patent Application No. Hei 10-237473) are effective for adsorption of sulfur compounds in fuel gases.

By the way, some fuel gases may contain a trace of moisture in the course of a manufacture process or a supply process. Especially, where a fuel gas containing moisture is treated with zeolite, it selectively adsorbs the moisture, so that the adsorptivity of a sulfur compound significantly lowers over the case where no moisture is contained or a very small amount of moisture is present. This is assumed for the reason that zeolite per se, which is utilized as a moisture absorber, is hydrophilic in nature and preferentially adsorbs moisture made of polar molecules. In view of this, the adsorbent for removal of sulfur compounds should selectively adsorb sulfur compounds alone in a fuel gas, and should also adsorb sulfur compounds selectively irrespective of the presence or absence of moisture in a fuel gas. However, prior-art adsorbents including those adsorbents set out in the above-discussed patent publications are not taken into consideration with regard to the selective adsorption.

As stated above, the amount of a residual sulfur compound contained in a fuel gas, from which sulfur compounds have been removed, should be at a concentration as low as possible when the fuel gas is used for steam reforming. This is for the purpose of preventing a steam reforming catalyst from poisoning with sulfur. Up to now, a copper-zinc adsorbent (Japanese Laid-open Patent Application No. Hei 6-256779) has been reported for use as an adsorbent for removing sulfur compounds from a gas to a very low concentration. However, this adsorbent has to be heated to a temperature of 150 to 250° C. in order to impart satisfactory properties thereto.

The assignee of the instant application previously proposed (Japanese Laid-open Patent Application No. Hei 10-237473) an adsorbent for sulfur compounds in gases, which is made of an Na—X type zeolite having a pore size of at least 5 angstroms or over. This adsorbent has excellent adsorptivity at normal temperatures. Although this adsorbent shows a satisfactory performance on gases having a low dew point, i.e. gases containing no or little moisture, however, it takes precedence of adsorption of moisture in a gas having a high dew point, so that the adsorptivity of sulfur compounds considerably lowers.

Figure 1:
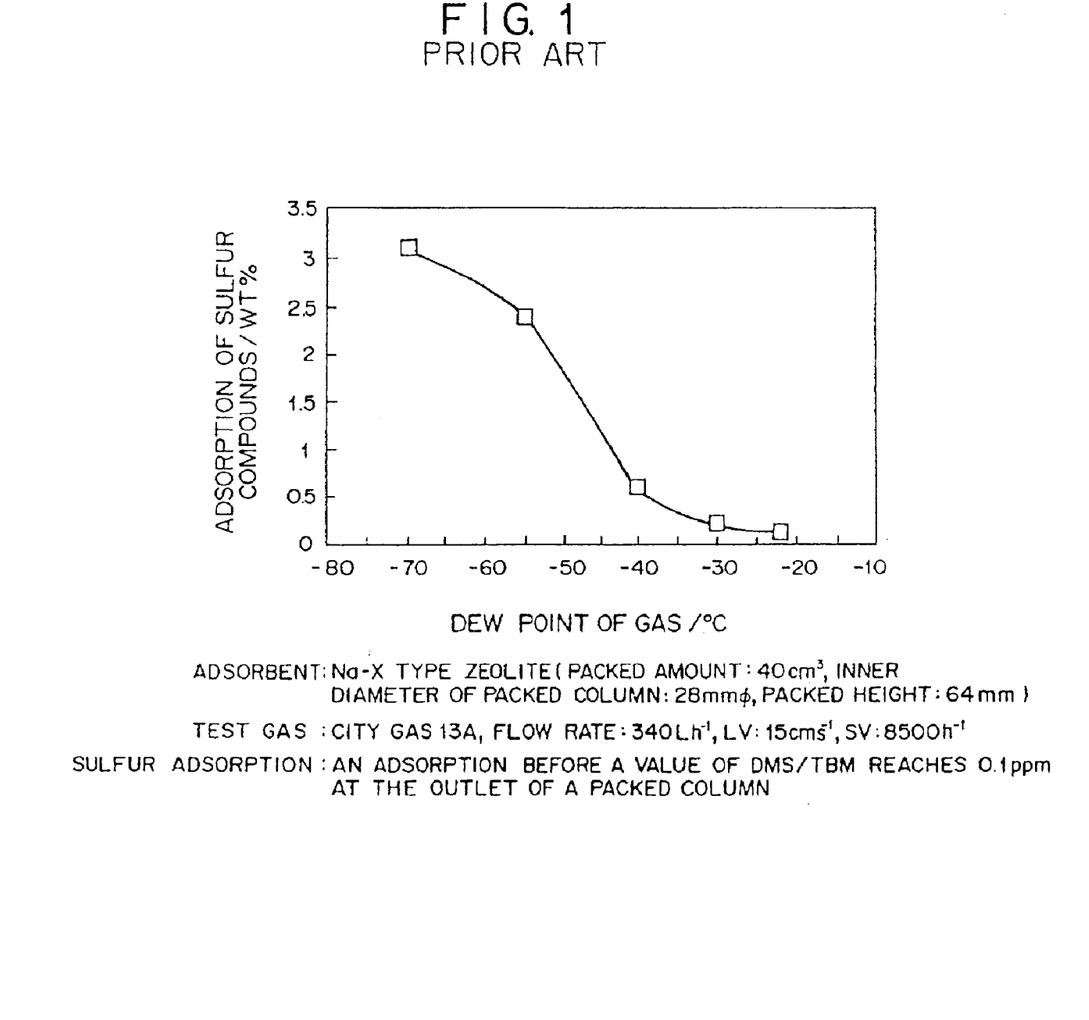
FIG. 1 is a graph showing measurements of adsorptivity of a previously developed adsorbent for sulfur compounds.

FIG. 1 is a graph showing measurements of the adsorbent. The test device and conditions are such that there is used a device as in Adsorption Test 1 described hereinafter wherein the adsorption test is carried out under different dew point conditions. As shown in FIG. 1, the adsorption performance is so excellent that the adsorption of sulfur is at 3 wt % at a dew point of −70° C. However, as the dew point increases or as the moisture content in the gas increases, the adsorption of sulfur sharply drops. For instance, the sulfur content at a dew point of −50° C. is at 1.5 wt %, that is about half at a dew point of −70° C. for the same adsorbent, and is as low as 0.2 wt % at a dew point of −30° C.

SUMMARY OF THE INVENTION

In view of the above-stated problems of the prior art, we made studies on adsorbents that effectively function, even when moisture is contained in a fuel gas, and found that an adsorbent comprising zeolite on which a specific type of transition metal, such as silver, copper or the like, is supported thereon through ion exchange exhibits excellent absorptivity of sulfur compounds at or in the vicinity of normal temperatures, even when moisture is contained in a fuel gas.

More particularly, the invention provides an adsorbent for removing one or more sulfur compounds from a fuel gas comprising one or more transition metals selected from Ag, Cu, Zn, Fe, Co and Ni supported on zeolite through ion exchange.

Further, the invention also provides a process for removing sulfur compounds from sulfur compounds-containing gas, characterized by passing sulfur compounds-containing fuel gas through a sulfur compounds-removing adsorbent which comprises one or more transition metals selected from Ag, Cu, Zn, Fe, Co and Ni supported on zeolite through ion exchange.

PREFERRED EMBODIMENTS OF THE INVENTION

In the practice of the invention, it is important that one or more transition metals selected from silver (Ag), copper (Cu), zinc (Zn), iron (Fe), cobalt (Co) and nickel (Ni) be supported on a zeolite through ion exchange to form a transition metal-deposited zeolite. In the invention, it is favorable to use, as the zeolite, any of X-type zeolites, Y-type zeolites and β-type zeolites among a diversity of existing zeolites.

Although the exchangeable cation used in the invention may be, for example, $Na^{+ion}$ or $H^{+ion}$, Na—Y-type zeolite is more excellent among Y-type zeolites, and H—Y-type zeolite is ranked next thereto.

In a preferred embodiment of the present invention, silver is supported on a Na—Y type zeolite having a $SiO_2/Al_2O_3$ molar ratio of from 4.8–6.0. The amount of silver deposited is from 13–21 wt %, more preferably from 15–20 wt %, based on the weight of the silver-deposited zeolite.

The adsorbent of the invention is able to effectively remove sulfur compounds contained in a fuel gas irrespective of a moisture concentration in the fuel gas. An adsorbent supporting Ag or Cu among the transition metals exhibit excellent adsorptivity for sulfur compounds.

The adsorbent for removing sulfur compounds from fuel gases according to the invention has excellent sulfur compound adsorptivity, especially, at or in the vicinity of normal temperatures. In this regard, the afore-stated hydrodesulfurization process undesirably needs heating to approximately 300 to 400° C., aside from the hydrogenation. Moreover, with the adsorbent proposed, for example, in the Japanese Laid-open Patent Application No. Hei 6-256779, it is necessary to heat to a temperature of 150 to 250° C. In contrast, with the adsorbent of the invention, such heating as mentioned above is unnecessary, and sulfur compounds can be effectively removed from a fuel gas at or in the vicinity of normal temperatures, thus being very convenient in practical applications. It will be noted that the adsorbent of the invention has the excellent capability of adsorption of sulfur compounds at or in the vicinity of room temperatures, and also has effective adsorptivity of sulfur compounds at higher temperatures, e.g. at a temperature of 50° C. or over.

The adsorbent of the invention for removing sulfur compounds can effectively adsorb and remove sulfides, thiophenes and mercaptans present in various types of fuel gases. More particularly, the adsorbent can be applied to adsorption and removal of one or more sulfur compounds among sulfur compounds in various types of fuel gases. Especially, the adsorbent can be favorably applied to removal by adsorption of sulfur compounds, which are contained in fuel gases, such as city gas, LP gas and natural gas, at a level of several ppm.

It is to be noted that the adsorption of DMS on a silver-supported Na—Y-type zeolite has been already reported (Journal of Nippon Kagaku Kaishi, 1981, No. 12, pp. 1945–1950). This report has the intention of treating bad smelling substances in air. Accordingly, those confirmed in this report are directed to an equilibrium adsorption of DMS in co-existence of nitrogen and moisture, and the test is such that the concentration of DMS used is as high as 100 ppm. More particularly, no report has been made yet with respect to the adsorption performance of DMS at a low concentration, the adsorption performance in fuel gases, the adsorption performance in the case where other types of sulfur compounds co-exist, and the performance on residual sulfur in the course of an adsorption test.

In contrast thereto, it has been found in the practice of the invention that the adsorbent can be effectively applied for adsorption and removal not only of sulfides such as DMS, but also of different types of sulfur compounds such as thiophenes and mercaptans in fuel gases. In addition, according to the invention, a sulfur compound, such as DMS, TBM or THT, which is contained in a fuel gas at a very low concentration of about 2 ppm, can be effectively adsorbed and removed to a level of a residual sulfur compound of 7 ppb or below.

Figure 3:
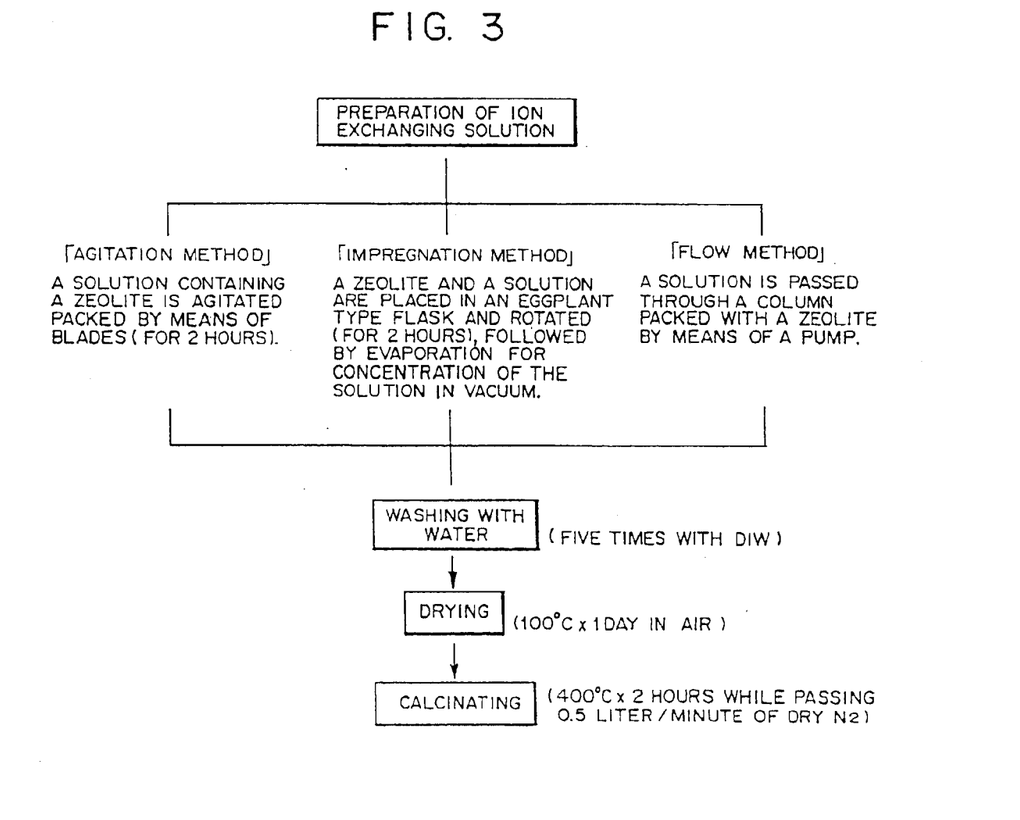
FIG. 3 is a flowchart showing three methods used for ion exchange in the examples and including (1) an agitation method, (2) an impregnation method and (3) a flow method.

For the manufacture of the adsorbent of the invention, one or more transition metals selected from silver, copper, zinc, iron, cobalt and nickel are supported on a zeolite according to an ion exchange technique. More particularly, compounds of silver, copper and the like are dissolved in water to provide an aqueous solution, followed by ion exchange with use of the solution. The compounds of the metals should be ion-exchanged with a cation ($Na^+$ or $H^+$) in the zeolite, and thus, should be made of a metal compound capable of being dissolved in water and existing as a metal ion in the aqueous solution. This aqueous solution is brought into contact with a zeolite according to a general ion exchange procedure including (1) an agitation procedure, (2) an impregnation procedure or (3) a flow procedure as is particularly shown in FIG. 3, thereby causing the cations in the zeolite to be exchanged with these metal ions. Thereafter, the zeolite is washed, such as with water, and dried to obtain an adsorbent of the invention. Although the zeolite may be calcined after drying, the calcination is not always necessary.

Figure 2:
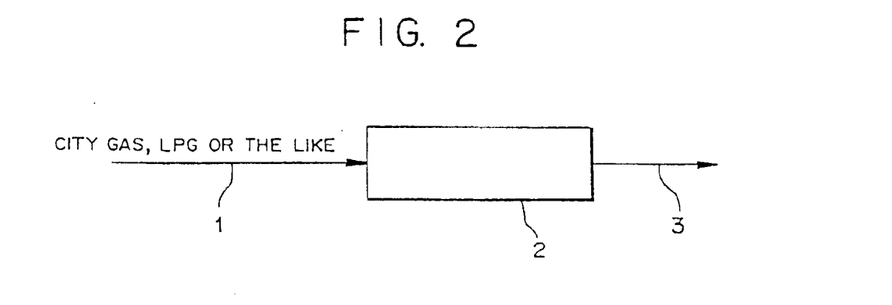
FIG. 2 is a schematic view showing an embodiment of a device for carrying out the invention.

The treatment of a fuel gas containing sulfur compounds with the adsorbent of the invention is carried out by passing a sulfur compound-containing fuel gas through the adsorbent to bring the gas into contact therewith in the same manner as a gas treatment using a conventional adsorbent. Especially, the adsorbent of the invention functions at or in the vicinity of normal temperatures without resorting to the additional application of heat, thus making a device structure and operations simple. FIG. 2 shows an example of a device for carrying out the invention. In FIG. 2, indicated by 1 is a sulfur compound-containing fuel gas charge pipe, by 2 is a sulfur compound adsorbent packed layer (reaction tube), and by 3 is a treated fuel gas discharge pipe. The sulfur compounds in the sulfur compound-containing fuel gas charged from the charge pipe 1 are adsorbed and removed in the adsorbent packed layer 2, and the resultant fuel gas is discharged from the discharge pipe 3.

According to the invention, a transition metal or metals such as silver, etc. are supported on a zeolite through ion exchange, so that the adsorption characteristic of sulfur compounds in a fuel gas can be appreciably improved irrespective of the concentration of moisture in the fuel gas. Accordingly, not only a required amount of an adsorbent can be reduced, but also the frequencies of exchange and regeneration can be lessened. According to the invention, sulfur compounds including not only DMS, but also sulfides, mercaptans, thiophenes and the like can be effectively, simultaneously removed from fuel gases containing such sulfur compounds. Moreover, the adsorbent of the invention is able to remove sulfur compounds from a fuel gas at or in the vicinity of normal temperatures, thus being very advantageous in practical applications. The adsorbent of the invention undergoes a color change as sulfur compounds are adsorbed thereon, and the life of the adsorbent can be appropriately judged from the color change.

Examples

The invention is described in more detail by way of examples, which should not be construed as limiting the invention thereto.

Preparation 1 of Test Adsorbents

There were used, as a zeolite, commercially available X-type zeolite (made by Tosoh Corporation, commercial name: F9-HA with a $SiO_2/Al_2O_3$ ratio (molar ratio herein and whenever it appears hereinafter) =2.5), commercially available β-type zeolite (made by Tosoh Corporation, commercial name: HSZ930HOD with a $SiO_2/Al_2O_3$ ratio=27.4), commercially available Na—Y-type zeolite (made by Tosoh Corporation, commercial name: HSZ320NAD with a $SiO_2/Al_2O_3$ ratio=5.7), commercially available H—Y-type zeolite (made by Tosoh Corporation, commercial name: HSZ320HOD with a $SiO_2/Al_2O_3$ ratio=5.6), H—USY-type zeolite (made by Tosoh Corporation, commercial name: HSZ360HUD with a $SiO_2/Al_2O_3$ ratio=13.7), K-L-type zeolite (made by Tosoh Corporation, commercial name: HSZ500KOD with a $SiO_2/Al_2O_3$ ratio=6.0), Na—mordenite-type zeolite (made by Tosoh Corporation, commercial name: HSZ642NAD with a $SiO_2/Al_2O_3$ ratio= 18.3). These zeolites were, respectively, in the form of cylindrical pellets (1.5 mm in diameter×3 to 4 mm in length) shaped by use of about 20 wt % of alumina or clay as a binder. On the other hand, silver nitrate, copper acetate, etc., were, respectively dissolved in distilled water to obtain aqueous solutions of the respective metal salts. These metal salt aqueous solutions were used for exchange of the cation ($Na^+$ or $H^+$) in the zeolites with an Ag ion, Cu ion, Zn ion, Fe ion, Co ion and/or Ni ion, followed by washing with distilled water (indicated as DIW in FIG. 3) five times, drying and calcinating.

In Table 1, the results of the experiments are summarized. In the column of "Sample Name" in Table 1, abbreviations are mentioned. In the column, for example, the term "Ag (Na)—Y" means Na—Y type zeolite supported thereon with Ag through ion exchange. This is true of Table 2 and also of the following description. It will be noted that drying and calcinating conditions were common to all the samples wherein drying was carried out in air at 100° C. for one day, and calcinating was performed in dry nitrogen at 400° C. for 2 hours. In this way, sample adsorbents wherein metals were, respectively, supported on different types of zeolites through ion exchange were obtained.

TABLE 1

Preparation of adsorbents

| Sample Name | Weight of zeolite/ g | Reagents used | Amount of reagent/ g | Amount of distilled water/g | Ion exchange method |
|---|---|---|---|---|---|
| Ag(Na)-Y | 30 | Silver nitrate | 22.9 | 500 | Agitation method |
| Ag(H)-Y | 50 | Silver nitrate | 31.1 | 500 | Flow method |
| Ag(Na)-X | 75 | Silver nitrate | 30.6 | 800 | Agitation method |
| Ag(H)-β | 30 | Silver nitrate | 11.0 | 150 | Impregnation method |
| Cu(H)-Y | 75 | Copper acetate monohydrate | 20.5 | 800 | Agitation method |
| Cu(Na)-X | 75 | Copper acetate monohydrate | 17.9 | 800 | Agitation method |
| Cu(H)-β | 30 | Copper acetate monohydrate | 6.9 | 150 | Impregnation method |
| Zn(H)-β | 30 | Zinc sulfate heptahydrate | 9.4 | 150 | Impregnation method |
| Fe(H)-β | 30 | Iron sulfate heptahydrate | 4.8 | 500 | Agitation method |
| Co(H)-β | 30 | Cobalt acetate tetrahydrate | 4.4 | 150 | Impregnation method |
| Ni(H)-β | 30 | Nickel acetate tetrahydrate | 4.4 | 150 | Impregnation method |
| Na(H)-β | 30 | Sodium chloride | 20.3 | 500 | Agitation method |
| Ag-USY | 50 | Silver nitrate | 14.4 | 500 | Flow method |
| Ag(K)-L | 30 | Silver nitrate | 21.9 | 500 | Agitation method |
| Ag(Na)-Mor | 30 | Silver nitrate | 8.5 | 150 | Impregnation method |

Adsorption Test 1 of Sulfur Compounds (Examples 1 to 13 and Comparative Examples 1 to 17)

Figure 4:
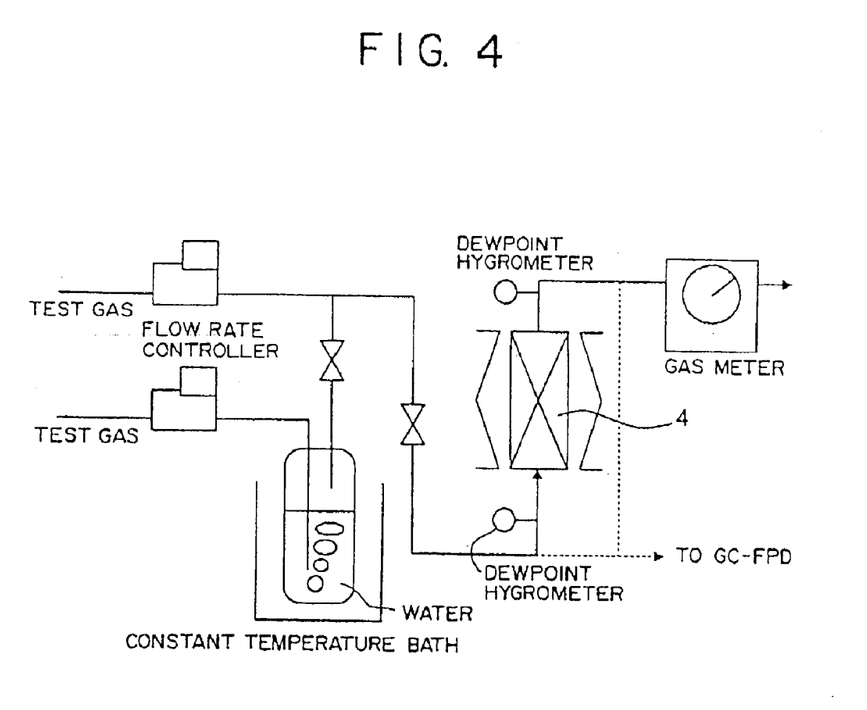
FIG. 4 is a schematic view showing a test device used in the examples.

Using a test device shown in FIG. 4, adsorption tests of sulfur compounds were conducted. In FIG. 4, reference numeral 4 indicates a packed column (i.e. a cylindrical reaction tube), in which the respective test adsorbents were packed, followed by carrying out an adsorption test of sulfur compounds. The test conditions are shown below.

Packed column: 28.4 mm in diameter×63.2 mm in height. Each test adsorbent was packed therein in an amount of 40 cm$^3$. Test gas: city gas (13A consists of methane=87.8%, ethane=5.9%, propane=4.6%, n-pentane=0.8%, and i-pentane=0.8% approximately). Sulfur compound concentration of test gas: 4.4 mg-S/N m$^3$ (DMS=50 wt % and TBM=50 wt %, corresponding to DMS=1.8 ppm and TBM=1.2 ppm in the gas). About 380 ppm (dew point of −30° C.) of water was added to the gas (by bubbling the test gas in water in a temperature controlled bath). Gas flow rate: 340 liters/hour, LV (linear velocity of gas)=15 cm/second, SV (space velocity)=8500 hour$^{-1}$. Temperature: room temperature (of about 20° C.). Pressure: normal pressure.

This adsorption test including comparative examples was performed using the same device and conditions as mentioned above.

The adsorption of sulfur compounds with each test adsorbent was determined in the following manner. Under the above-indicated test conditions, a test gas was introduced from the inlet of the packed column, and the gas discharged from the outlet of the packed column was sampled in relation to time and the concentration of the sulfur compounds were determined by GC-FPD (flame photometric detector-equipped gas chromatography). The adsorption of the sulfur compounds at the outlet is calculated according to the following equation wherein the total adsorption of the sulfur compounds was integrated before the concentrations of sulfur compounds at the outlet of the packed column arrived at 0.1 ppm. Adsorption of sulfur compounds $$\text{(wt \%)} = \text{amount of sulfur in adsorbed sulfur compounds (g)/weight of adsorbent (g)} \times 100 \quad (1)$$

Table 2 shows the results of the adsorption test. In Table 2, there are also shown, for comparison, the results of the adsorption tests using, aside from different types of test adsorbents and commercially available zeolites per se, commercially available adsorbents and porous materials that are considered to have adsorption action.

TABLE 2-1

Results of Adsorption Test 1

| Sample name | Base material | Si/Al$_2$ *1 | Name of adsorbent (commercial name, etc.) | Manufacturer | Adsorption of sulfur compounds *2 |
|---|---|---|---|---|---|
| Examples | | | | | |
| Example 1 | Ag(Na)-Y | Na-Y zeolite | 5.7 | HSZ320 NAD | Tosoh Corp. | 4.10 wt % |
| Example 2 | Ag(H)-Y | H-Y zeolite | 5.6 | HSZ320 HOD | Tosoh Corp. | 1.91 wt % |
| Example 3 | Ag(Na)-X | Na-X zeolite | 2.5 | F9-HA | Tosoh Corp. | 1.73 wt % |
| Example 4 | Ag(H)-β | H-β zeolite | 27.4 | HSZ390 HOD | Tosoh Corp. | 1.70 wt % |
| Example 5 | Ag(H)-USY | H-USY zeolite | 13.7 | HSZ360 HUD | Tosoh Corp. | 0.34 wt % |

TABLE 2-1-continued

Results of Adsorption Test 1

| | Sample name | Base material | Si/Al$_2$ *1 | Name of adsorbent (commercial name, etc.) | Manufacturer | Adsorption of sulfur compounds *2 |
|---|---|---|---|---|---|---|
| Example 6 | Ag(K)-L | K-L zeolite | 6.0 | HSZ500 KOD | Tosoh Corp. | 0.19 wt % |
| Example 7 | Ag(Na)-Mor | Na-modenite zeolite | 18.3 | HSZ642 NAD | Tosoh Corp. | 0.46 wt % |
| Example 8 | Cu(H)-Y | H-Y zeolite | 5.6 | HSZ320 HOD | Toso Corp. | 1.17 wt % |
| Example 9 | Cu(H)-β | H-β zeolite | 27.4 | HSZ390 HOD | Toso Corp. | 1.10 wt % |
| Example 10 | Zn(H)-β | H-β zeolite | 27.4 | HSZ390 HOD | Tosoh Corp. | 0.24 wt % |
| Example 11 | Fe(H)-β | H-β zeolite | 27.4 | HSZ390 HOD | Tosoh Corp. | 0.14 wt % |
| Example 12 | Co(H)-β | H-β zeolite | 27.4 | HSZ390 HOD | Tosoh Corp. | 0.14 wt % |
| Example 13 | Ni(H)-β | H-β zeolite | 27.4 | HSZ390 HOD | Tosoh Corp. | 0.13 wt % |
| Comparative Examples | | | | | | |
| Comp. Ex. 1 | Na-Y | Na-Y zeolite | 5.7 | HSZ320 NAD | Tosoh Corp. | <0.01 wt % |
| Comp. Ex. 2 | H-Y | H-Y zeolite | 5.6 | HSZ320 HOD | Tosoh Corp. | 0.05 wt % |
| Comp. Ex. 3 | Na-X | Na-X zeolite | 2.5 | F9-HA | Tosoh Corp. | 0.23 wt % |
| Comp. Ex. 4 | H-β | H-β zeolite | 27.4 | HSZ390 HOD | Tosoh Corp. | 0.06 wt % |
| Comp. Ex. 5 | Na-β | H-β zeolite | 27.4 | HSZ390 HOD | Tosoh Corp. | 0.04 wt % |
| Comp. Ex. 6 | H-USY | H-USY zeolite | 13.7 | HSZ360 HUD | Tosoh Corp. | <0.01 wt % |
| Comp. Ex. 7 | K-L | K-L zeolite | 6.0 | HSZ500 KOD | Tosoh Corp. | <0.01 wt % |
| Comp. Ex. 8 | Na-Mor | Na-mordenite zeolite | 18.3 | HSZ642 NAD | Tosoh Corp. | 0.01 wt % |
| Comp. Ex. 9 | H-Mor | H-mordenite zeolite | 15.0 | HSZ620 HOD | Tosoh Corp. | <0.01 wt % |
| Comp. Ex. 10 | Activated carbon | Activated carbon (for halogen adsorption) | | XRC824 | Takeda Chem. Ind. Co. | 0.03 wt % |
| Comp. Ex. 11 | Activated carbon | | | TAC824 | Takeda Chem. Ind. Co. | 0.03 wt % |
| Comp. Ex. 12 | Activated carbon | Activated carbon (for sulfur adsorption) Activated carbon (for odorant adsorption) | | SRCX | Takeda Chem. Ind. Co. | 0.07 wt % |
| Comp. Ex. 13 | Metal oxide | ZnO | | C7-2 | Toyo CCI | — |
| Comp. Ex. 14 | Alumina | Activated alumina | | KHD12 | Sumitomo Chem. Ind. Co. | 0.01 wt % |
| Comp. Ex. 15 | Alumina | Activated alumina | | KHO12 | Sumitomo Chem. Ind. Co. | — |
| Comp. Ex. 16 | Silica | Silica gel | | A type | Fuji Silicia Chem. Co. | 0.08 wt % |
| Comp. Ex. 17 | Silica | Silica gel | | B type | Fuji Silicia Chem. Co. | <0.01 wt % |

*1: Si/Al$_2$ means a molar ratio of SiO$_2$/Al$_2$O$_3$.
**2: The mark "—" at the column of Adsorption of sulfur compounds means that the break-through of the sulfur compounds started to occur immediately after commencement of the test and substantially no adsorptivity of the sulfur compounds took place.

As will be apparent from Table 2, with the commercially available zeolites (Comparative Examples 1 to 9), the sulfur adsorption is, at most, as low as 0.23 wt %. With respect to the adsorbents other than the commercially available zeolites (Comparative Examples 10 to 17), the adsorption is still lower. More particularly, these results reveal that the adsorbents made of the commercially available zeolites and activated carbons and the like are not useful as an adsorbent for sulfur compounds in a moisture-containing fuel gas, respectively.

In contrast, in view of Examples of 1 to 13, wherein a transition metal such as Ag, Cu, Zr, Fe, Co or Ni is supported on each of the commercially available zeolites (Comparative Examples 1 to 8) through ion exchange, the sulfur adsorptivity is effectively improved over those of the commercially available zeolites alone.

Especially, where silver or copper is supported on the X-type zeolite, Y-type zeolite or β-type zeolite through ion exchange (Examples 1 to 4, 8 to 9), the adsorption of sulfur compounds exceeds 1 wt %, and thus, a very effective adsorption characteristic is ensured. Among them, the sulfur adsorption of the case (Example 1) wherein Ag is supported on the Na—Y type zeolite through ion exchange is at 4.1 wt %, ensuring a very excellent adsorption characteristic.

It has been demonstrated that the test gas contains 1.8 ppm of DMS, 1. 2 ppm of TBM and about 380 ppm of moisture, and DMS and TBM can be effectively adsorbed in the co-existence of moisture.

We unexpectedly found during the course of the experiments that as the adsorbents of Examples 1 to 9 adsorbed the sulfur compounds, they underwent a clear color change. The results of the observation are shown in Table 3. In the column "Prior to Test" in Table 3, a color of each adsorbent in such a state as to have the capability of sulfur adsorption (i.e. the capability of desulfurization) before the test is carried out is shown. In the column "After Test", the color of the adsorbent obtained after having carried out the adsorption test, or in such a state as to have little or no sulfur adsorptivity after adsorption of sulfur to saturation (no capability of desulfurization) is shown.

TABLE 3

Color Change of Adsorbent

| Example Nos. | Name of Sample | Prior to Test (with capability of desulfurization) | After Test (with no capability of desulfurization) |
| --- | --- | --- | --- |
| Example 1 | Ag(Na)-Y | White | Brown |
| Example 2 | Ag(H)-Y | White | Brown |
| Example 3 | Ag(Na)-X | Light brown | Brown |
| Example 4 | Ag(H)-β | White | Brown |
| Example 5 | Ag(H)-USY | White | Brown |
| Example 6 | Ag(K)-L | White | Brown |
| Example 7 | Ag(Na)-Mor | White | Brown |
| Example 8 | Cu(H)-Y | Blue | Brown |
| Example 9 | Cu(H)-β | Blue | Brown |
| Comp. Ex. 1 | Na-Y | White | White |
| Comp. Ex. 2 | H-Y | White | White |
| Comp. Ex. 3 | Na-X | Light brown | Light brown |
| Comp. Ex. 4 | H-β | White | White |
| Comp. Examples 10 to 12 | Activated carbon | Black | Black |
| Comp. Ex. 13 | Metal oxide | Black | Black |

In Table 3, for example, with the Na—Y type zeolite of Comparative Example 1, the adsorbent prior to the test was white in color and no color change took place after the test. Similar results are obtained in the other comparative examples.

In contrast, with Ag(Na)—Y of Example 1, for example, the adsorbent prior to the test was white in color and changed to brown after the test. This color change took place in a similar way in other Examples 2 to 7.

In any of Examples 1 to 9, as the adsorption of the sulfur compounds in the fuel gas was in progress, the color change gradually proceeded from the inlet side of the adsorbent bed toward the outlet side. After passage of a certain time after commencement of the test, it was confirmed that the leading point of the color change arrived at the vicinity of the outlet of the adsorbent bed. During the course of these tests, the treated gas was sampled in relation to time from the outlet of the adsorption tube and subjected to continuous measurement of the concentrations of the sulfur compounds in the gas by means of GC-FPD. As a result, it was found that in all of Examples 1 to 9, the sulfur compounds were detected some time after the color change arrived at the outlet of the adsorbent bed, thus resulting in the commencement of break-through.

When this color change is utilized, the life of the adsorbent for sulfur compounds in a fuel gas can be simply, reliably judged depending on the color change and replacement to the new adsorbent can be conducted suitably.

Preparation 2 of test adsorbents

With respect to the adsorbent of the type wherein Ag was supported on the Na—Y type zeolite through ion exchange and which exhibited a very excellent sulfur adsorptivity as set out hereinabove, an adsorption performance was tested in relation to the mixing ratio between silver nitrate and Na—Y type zeolite at the time of ion exchange and the ion exchange time. Table 4 shows the preparation conditions of the samples. The ion exchange of Ag was carried out by mixing the same type of Na—Y type zeolite (Tosoh Corporation, commercial name: HSZ320NAD, cylindrical pellets) as used in Preparation 1 of Test Adsorbent and a silver nitrate aqueous solution at different Ag/Na ratios (i.e. molar ratios between Ag in the aqueous solution and Na in the Na—Y type zeolite) ranging from 0.05 to 0.75 and subjecting it to an agitation method (sample Nos. 1 to 5). Moreover, the Ag/Na ratio was set at a given value (Ag/Na mixing ratio was 0.75), under which samples were prepared while using an aqueous solution of 50° C. and changing an ion exchange time of 1 hour to 15 hours (sample Nos. 5 to 7).

TABLE 4

Adsorbent preparation method of Examples 14, 15

| Sample No. | Ag/Na (mixing ratio) | Weight of zeolite/ g | Silver nitrate/ g | Distilled water/ g | Ion exchange Temperature/° C. | Ion exchange time/ hours |
| --- | --- | --- | --- | --- | --- | --- |
| 1 | 0.05 | 50 | 1.36 | 800 | 50 | 3 |
| 2 | 0.15 | 50 | 4.10 | 800 | 50 | 3 |
| 3 | 0.38 | 50 | 10.34 | 800 | 50 | 3 |
| 4 | 0.50 | 50 | 13.60 | 800 | 50 | 3 |
| 5 | 0.75 | 50 | 20.40 | 800 | 50 | 3 |
| 6 | 0.75 | 50 | 20.40 | 800 | 50 | 1 |
| 7 | 0.75 | 50 | 20.40 | 800 | 50 | 15 |

Example 14 = Sample Nos. 1 to 5, Example 15 = Sample Nos. 5 to 7

Adsorption Test 2 of Sulfur Compounds (Examples 14, 15)

Using the test device shown in FIG. 4, an adsorption test of sulfur compounds was conducted. The cylindrical pellets obtained in Preparation 2of Test Adsorbents were divided into pieces classified to have a size of 0.35 mm to 0.71 mm and packed in amount of 1.0 cm$^3$ in a quartz tube (packed column as 4 in FIG. 4) having an inner diameter of 8 mm. A test gas used was one wherein about 1000 ppm of moisture (corresponding to a dew point of −20° C.) was added to DMS diluted with nitrogen (DMS=10 ppm/N$_2$). The flow rate of the gas was set at 1000 cm$^3$ /minute (SV (space velocity)=.60000 h$^{-1}$), and a gas at the outlet side of an adsorbent was sampled in relation to time, followed by measurement at given intervals of time by means of GC-FPD to determine a concentration of DMS. The results are shown in Table 5. In Table 5, the term "break-through time" means a time before the concentration of DMS in the gas discharged from the outlet of the packed column arrived at 0.1 ppm. The term "Adsorption of Sulfur Compounds" means an amount of sulfur in DMS adsorbed before arrival at the break-through time and calculated according to the afore-indicated equation (1).

TABLE 5

Test results of Examples 14, 15

| Sample No. | Measured dew point/° C. | Adsorption temperature/° C. | Break-through time/ minutes | Adsorption of Sulfur Compounds/ wt % |
|---|---|---|---|---|
| 1 | −20.6 | 26.7 | 504 | 1.23 |
| 2 | −20.5 | 27.5 | 854 | 2.12 |
| 3 | −19.7 | 25.0 | 1778 | 3.52 |
| 4 | −20.3 | 26.5 | 1827 | 4.30 |
| 5 | −20.5 | 25.3 | 2145 | 4.92 |
| 6 | −19.4 | 27.8 | 1775 | 3.88 |
| 7 | −19.7 | 26.9 | 2045 | 4.87 |

Example 14 = sample Nos. 1 to 5 (adsorbents different in amount of the ion exchanged metal).
Example 15 = Sample Nos. 5 to 7 (adsorbents different in ion exchange time).

As shown in Table 5 (sample Nos. 1 to 5 of Example 14), the adsorbents wherein the Na—Y type zeolite was ion-exchanged with Ag exhibited a sulfur adsorption of 1 wt % over in all the cases, and in the case where the amount of the exchanged Ag is small (wherein an Ag/Na mixing ratio is small), a satisfactory effect is obtained. On the other hand, it will be seen that when the amount of Ag relative to the Na—Y type zeolite is large (wherein the Ag/Na mixing ratio is large), the adsorption is increased. As shown in Table 5 (sample Nos. 5 to 7 of Example 15), the adsorptivity of the adsorbents wherein the Na—Y type zeolite is ion-exchanged with Ag is substantially at an intended level when the ion exchange time is approximately 3 hours or over.

Adsorption Test 3 of Sulfur Compound (Example 16)

Using the same device as used in Adsorption Test 2, an adsorbent of sample No. 3 prepared in Preparation 2 of test adsorbent was packed in a quartz tube (packed column 4 in FIG. 4) in an amount of 0.5 cm$^3$, and a test gas composed of DMS diluted with nitrogen (DMS=10 ppm/N$_2$), which about 1000 ppm of moisture (dew point of −20° C.) was added, was used. The gas flow rate was set at 1000 cm$^3$/ minute (SV=120000 hour$^{-1}$), and the gas discharged from the outlet of the packed column was sampled in relation to time, followed by measurement at given intervals of time by means of GC-FPD to determine a concentration of DMS. The adsorption tube was placed in a thermostatic container wherein the adsorption test was carried out at room temperature of about 20° C., and also carried out at different temperatures of about 50° C. and about 80° C.

The results are shown in Table 6. In Table 6, the term "break-through time" means a time before the concentration of DMS in the gas discharged from the outlet of the packed column arrived at 0.1 ppm. The term "Adsorption of Sulfur Compounds" means an amount of sulfur in DMS adsorbed before arrival at the break-through time, which is calculated according to the afore-indicated equation (1). As shown in Table 6, the adsorptivity of the adsorbents wherein Na—Y type zeolite was ion exchanged with silver is the highest in the vicinity of 20° C. As the adsorption temperature increases, the adsorptivity lowers to some degree and the lowering of the adsorption at 80° C. is only about 20%, thus exhibiting effective adsorptivity irrespective of the adsorption temperature.

TABLE 6

Results of Adsorption Test 3 (Example 16)

| Adsorption temperature/° C. | Measured dew point/° C. | Adsorption of Sulfur compounds/wt % |
|---|---|---|
| 21.5 | −20.8 | 3.65 |
| 50.7 | −19.0 | 3.54 |
| 80.6 | −21.8 | 2.88 |

Adsorption Test 4 of Sulfur Compound (Example 17)

Using the same device as used in Adsorption Test 2, the adsorbent of sample No. 3 (Ag/Na mixing ratio=0.38) prepared in Preparation 2 of test adsorbent and the adsorbent of sample No. 5 (Ag/Na mixing ratio=0.75) were respectively, packed in a quartz tube (packed column 4 in FIG. 4) in an amount of 1.0 cm$^3$, and a test gas composed of THT diluted with nitrogen (THT=10 ppm/N$_2$), to which about 1000 ppm of moisture (dew point of −20° C.) was added, was used. The gas flow rate was set at 1000 cm$^3$/ minute (SV=60000 hour$^{-1}$), and the gas discharged from the outlet of the packed column was sampled in relation to time, followed by measurement at given intervals of time by means of GC-FPD to determine a concentration of THT.

The results are shown in Table 7. In Table 7, the term "break-through time" means a time before the concentration of THT in the gas discharged from the outlet of the packed column arrived at 0.1 ppm. The term "Adsorption of Sulfur Compounds" means an amount of sulfur in THT adsorbed before arrival at the break-through time, which is calculated according to the afore-indicated equation (1). As shown in Table 7, the adsorbent wherein Na—Y zeolite is ion-exchanged with silver exhibits effective adsorptivity against a small amount of THT present in the gas irrespective of time amount of the ion-exchanged silver.

TABLE 7

Results of Adsorption Test 4 (Example 17)

| Sample No. | Measured dew point/° C. | Adsorption temperature/° C. | Break-through time/ minutes | Adsorption of Sulfur Compounds/ wt % |
|---|---|---|---|---|
| 3 | −18.75 | 30.0 | 1877 | 4.13 |
| 5 | −19.54 | 26.0 | 2172 | 4.45 |

Adsorption Test 5 of Sulfur Compound (Example 18)

In the Adsorption Tests 1 to 4, the performance of the adsorbents was evaluated by sampling a gas from the outlet of the adsorbent packed column in relation to time and analyzing by means of GC-FPD. In this Adsorption Test 5, a gas at the outlet of the adsorbent packed column was analyzed by means of GC-SCD (gas chromatograph equipped with a chemical emission detector for sulfur) that could analyze a very low concentration of sulfur at higher sensitivity. The test conditions were the same as in Adsorption test 1 except that any moisture was not added to the test gas (dew point of about −60° C.). Table 8 shows the results of the analysis at the time of 25 hours after commencement of the test. For comparison, the corresponding values in Example 1 using GC-FPD are also indicated.

TABLE 8

Results of Adsorption Test 5 (Example 18)

| | Detector | Lower limit of detection | Results of analysis at outlet of adsorption column |
|---|---|---|---|
| Example 1 | GC-FPD | About 50 ppb | Lower than the lower limit of detection |
| Example 18 | GC-SCD | About 7 ppb | Lower than the lower limit of detection |

As stated hereinbefore, the concentration of a residual sulfur compound contained in a fuel gas after removal of sulfur compounds should preferably be as low as possible. As will be apparent from Table 8, when using the adsorbent of the invention, the sulfur compound component in the city gas can be adsorbed and removed to a very low concentration of 7 ppb or below.

Performance Test of Y-type Zeolite in Respect of Types Thereof (Exhibit 19)

Using the test device of FIG. 4, an adsorption test of sulfur compounds for various desulfurization agents under test was conducted. In FIG. 4, various adsorbents being tested are filled in a filling tube (cylindrical reaction tube), and the adsorption test of each sulfur compound is conducted. The testing of silver-supported Y-type zeolite through ion exchange is conducted by introducing or mixing various Y-type zeolite of 75 g into distilled water of 800 ml together with silver nitrate of 30.6 g and agitating them for three hours. This is also applied to silver-supported various types of zeolite through ion exchange as set forth in following Examples 20 and 21.

Test conditions are the same as those set forth in Examples 14 and 15 wherein various samples of desulfurization agents were tested by the same test device and the same conditions. The amount of adsorption of the sulfur compounds by the various samples of desulfurization agents was found based on the description as set forth in Examples 14 and 15 (including equation (1)).

Test data of silver-supported various types of zeolite obtained by this test are shown in Table 9. As shown in Table 9, the adsorption of sulfur in the case of using H—Y-type zeolite is merely half as much as Na—Y-type zeolite which is substantially the same as H—Y-type zeolite in silica/alumina ratio. It is conjectured, that in the case of the H—Y-type zeolite, this is caused by that fact that ion exchange does not develop and silver content is low. Further, the adsorption of sulfur of USY-type zeolite (ultra-stabilized Y-type zeolite wherein silica/alumina ratio increases by de-aluminium method) further drops.

TABLE 9

| Raw material zeolite | | Ion exchange conditions | | Silver | Adsorption |
|---|---|---|---|---|---|
| Type | Silica/alumina ratio | Zeolite/g | Silver nitrate/g | content/ wt % | of sulfur/ wt % |
| Na-Y | 3.3 | 75 | 30.6 | 22.5 | 1.8 |
| Na-Y | 5.1 | 75 | 30.6 | 22.6 | 4.5 |
| Na-Y | 5.6 | 75 | 30.6 | 18.4 | 4.2 |
| Na-Y | 5.7 | 30 | 22.9 | 25.5 | 4.1 |
| H-Y | 5.6 | 50 | 31.1 | 11.1 | 1.9 |
| USY | 14 | 50 | 14.4 | 2.2 | 0.3 |

Performance Test of Na—Y-type Zeolite with Respect to Silica/Alumina Ratio (Example 20)

Figure 5:
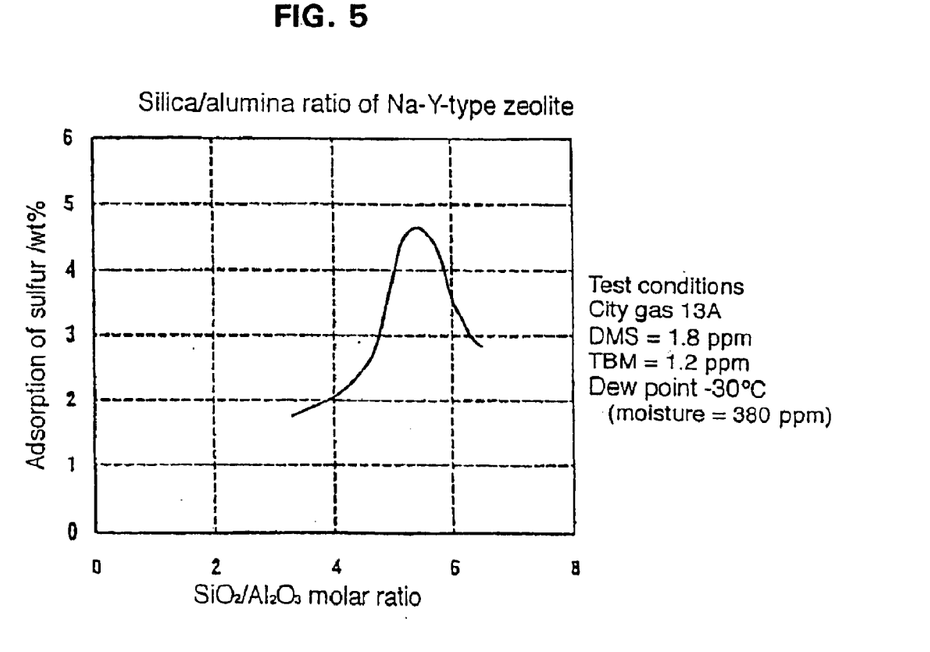
FIG. 5 is a view showing the result of performance test of Na—Y-type zeolite with respect of silica/alumina ratio.

Adsorption testing of desulfurization agents in which various types of silver-supported Na—Y zeolite having different silica/alumina ratios through ion exchange was performed. Other test conditions were the same as those set forth hereinbefore (I. Performance test of Y-type zeolite with respect of types thereof). FIG. 5 shows the results of the tests.

FIG. 5 shows the performance of adsorption of sulfur at not less than 3.5 wt % with respect to a $SiO_2/Al_2O_3$ molar ratio ranging from 4.8 to 6.0 and the adsorption of sulfur at not less than 4.0 wt % with respect to a $SiO_2/Al_2O_3$ molar ratio ranging from 5.0 to 5.8. From this fact, it is found that the inventive adsorbent's adsorption of sulfur has distinguishing critical points where it varies largely at a silica/alumina ratio ranging from 4.8 to 5.0 as a lower limit and ranging from 5.8 to 6.0 as an upper limit.

The amount of introduction of silver through ion exchange for a Y-type zeolite is generally large as the silica/alumina ratio is low like the other types of zeolite. Further, it is expected that the adsorption of sulfur increases as the amount of introduction of silver increases. Whereupon, as shown in FIG. 5, in the case of Na—Y-type zeolite, the adsorption of sulfur decreases if the silica/alumina ratio is lower than about 4.8 which serves as a boundary, while the adsorption of sulfur decreases if the silica/alumina ratio is higher than about 6, which also serves as a boundary, and illustrates a fact different from the foregoing common knowledge.

Performance Test of a Na—Y-type Zeolite Containing Silver having Silica/Alumina Ratio Ranging from 4.8 to 6.0 with Respect to the Silver Content of the Adsorbent and Moisture Content of the Source Gas (Example 21)

Figure 6A:
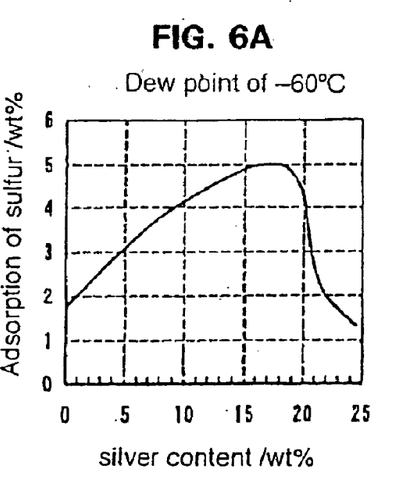
FIGS. 6(a)–(c) are views showing the relation between silver content and adsorption of sulfur at different dew points.
Figure 6B:
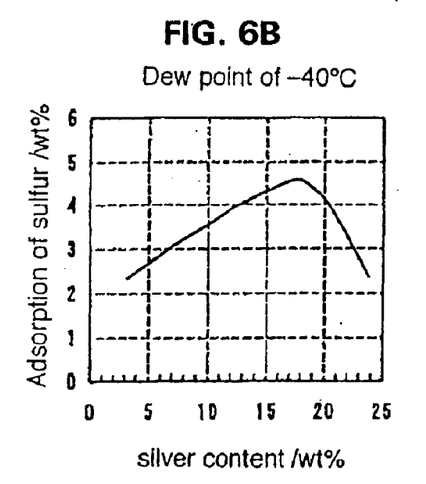
Figure 6C:
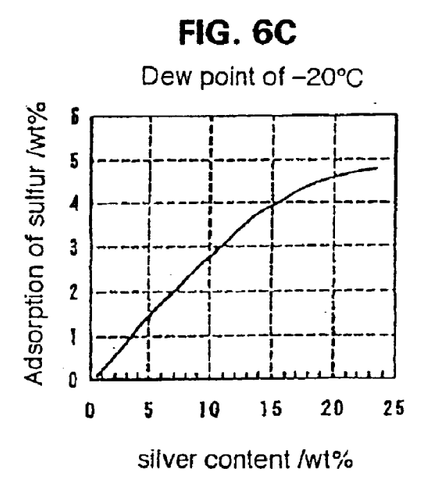

Adsorption testing of desulfurization agent in which various types of silver-exchanged Na—Y zeolite with various silver contents and having a $SiO_2/Al_2O_3$ molar ratio of 5.6 included in silica/alumina ratio ranging from 4.8 to 6.0 through ion exchange is performed. Supposing that the dew point of fuel gas is −60° C. (moisture=10 ppm), −40° C. (moisture=127 ppm), −20° C. (moisture=1000 ppm), testing of each gas having different dew points is conducted. The other test conditions are the same as discussed above (I. Performance test of Y-type zeolites with respect to types thereof). FIGS. 6A to 6C show the results of the tests.

As shown in FIG. 6A, the adsorption of sulfur in the case of a dew point of −60° C. gradually increases as the silver content increases and it reaches a peak of 5.0 wt % when the silver content is at 18.4 wt % and then it sharply decreases at a silver content of 18.4 wt % or more. Further, as shown in FIG. 6B, the adsorption of sulfur in the case of a dew point of −40° C. gradually increases as the silver content increases and it reaches a peak of 4.6 wt % when the silver content is at 18.4 wt % and it drops more gradually than the ease at a dew point of −60° C. As shown in FIG. 6C, the adsorption of sulfur in the case of a dew point of −20° C. gradually increases as the silver content increases and is 4.5 wt % when the silver content is at 20.0 wt %.

It is found from FIGS. 6A and 6B that although the adsorption of sulfur increases as the silver content increases at a region where the silver content is low in the cases when the dew point is −60° C. and −40° C. and there is a tendency that the performance degrades at peak of silver content of 18.4 wt %. In the case of a dew point of −60° C., the adsorption of sulfur sharply drops at a silver content of 20 wt % and serves as a boundary.

Further, FIG. 6C shows that a silver content of not less than 13.0 wt % is needed so as to enable an amount of sulfur adsorption of not less than 3.5 wt % at a dew point of −20° C.

FIGS. 6A to 6C show the range of silver content capable of exhibiting desulfurization performance of the adsorption of sulfur in an amount of 2.5 to 4.0 wt % based on the results of the tests. It is found from Table 10 that a silver content of 11 to 21 wt % is needed for obtaining a desulfurization performance of the adsorption of sulfur of not less than 3.0 wt % regardless of the moisture concentration (dew point) of the fuel gas while a silver content of 13 to 21 wt % is needed for obtaining a desulfurization performance of the adsorption of sulfur of not less than 3.5 wt %. Further, it is found that a silver content of 15 to 20 wt % is needed for obtaining a desulfurization performance of the adsorption of sulfur of not less than 4.0 wt %.

TABLE 10

Range of silver content capable of exhibiting adsorption of sulfur in an amount of 2.5 to 4 wt % under the condition of various dew points

| | | Range of silver content/wt % | | |
|---|---|---|---|---|
| | dew point | −60° C. | −40° C. | −20° C. |
| Adsorption of sulfur | 4.0 wt % | 10 to 20 | 13 to 20 | not less than 15 |
| | 3.5 wt % | 7 to 21 | 10 to 22 | not less than 13 |
| | 3.0 wt % | 5 to 21 | 7 to 23 | not less than 11 |
| | 2.5 wt % | 3 to 22 | 4 to 24 | not less than 9 |

What is claimed is:

1. A method of removing sulfur compounds from a fuel gas comprising at least one sulfur compound selected from the group consisting of thiophenes, sulfides and mercaptans comprising the steps of: depositing silver in an amount of 13–21 wt % on a Na—Y zeolite having a $SiO_2/Al_2O_3$ molar ratio of from 4.8–6.0 by ion exchange and passing the fuel gas through an adsorbent comprising the silver-deposited zeolite to remove the sulfur compounds therefrom.

2. The method of claim 1, wherein the silver-deposited zeolite has a silver content of from 15–20 wt %.

3. The method of claim 1, wherein the fuel gas is selected from the group consisting of a city gas, a natural gas and a liquefied petroleum gas.

4. The method of claim 1, wherein the fuel gas has a residual sulfur compound concentration of no greater than 7 ppb after passing through the adsorbent.

5. The method of claim 1, wherein the sulfur compounds are removed at room temperature.

6. The method of claim 1, additionally comprising the step of determining the life of the adsorbent based on a color change thereof.

* * * * *